United States Patent [19]

Nakano et al.

[11] 4,138,655

[45] Feb. 6, 1979

[54] HIGH TEMPERATURE SENSOR

[75] Inventors: Masamitsu Nakano, Yokohama; Iwao Inoue, Chiba, both of Japan

[73] Assignees: Niles Parts Co., Ltd.; Nihon Dennetsu Co., Ltd., both of Japan

[21] Appl. No.: 862,150

[22] Filed: Dec. 19, 1977

[30] Foreign Application Priority Data

Aug. 6, 1977 [JP] Japan .................................. 52-094805

[51] Int. Cl.² .............................................. H01C 7/00
[52] U.S. Cl. ...................................... 338/30; 252/521; 338/28; 338/271
[58] Field of Search ...................... 338/30, 25, 26, 28, 338/271, 265, 224, 238, 229, 226; 73/359, 362 AR; 252/518, 521; 29/613, 614, 615, 612

[56] References Cited

U.S. PATENT DOCUMENTS

| 2,271,975 | 2/1942 | Hall | 338/30 |
| 3,748,624 | 7/1973 | Yazawa et al. | 338/30 |

OTHER PUBLICATIONS

Fire and Overheat Detection Systems, Fenwal Bulletin MC-212.

Primary Examiner—C. L. Albritton
Attorney, Agent, or Firm—Lane, Aitken & Ziems

[57] ABSTRACT

A high temperature sensor in which a mixture of a metal fluoride composition and magnesium oxide is filled with pressure into a cylindrical case forming one electrical terminal for supporting a conductive rod forming the other electrical terminal, the high temperature sensor being prevented from malfunction of the sensor due to any vibration and having a high response speed for temperature detection to a change of temperature of the atmosphere.

3 Claims, 1 Drawing Figure

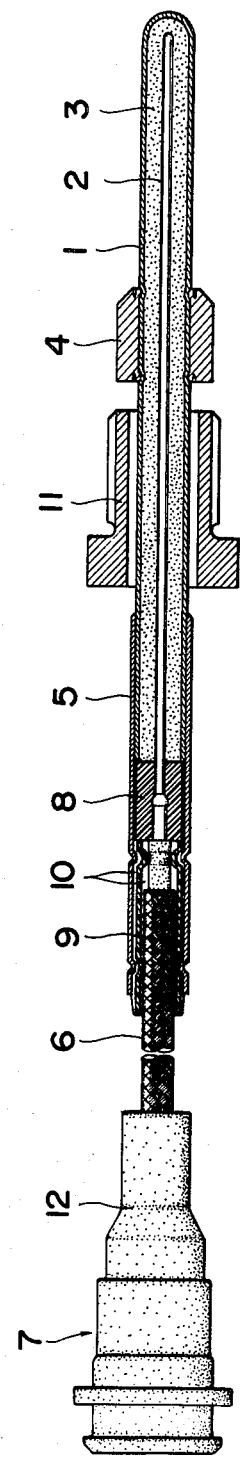

HIGH TEMPERATURE SENSOR

BACKGROUND OF THE INVENTION

Field of the Invention

The present invention relates to a high temperature sensor having an operating point in a high temperature region.

DESCRIPTION OF THE PRIOR ART

Recently, the demand of the controller for controlling an operating temperature of a catalyst converter and a thermal reactor used for scavenging exhaust gas of automobiles using an internal combustion engine as an energy source has increased.

The operating temperature requested for the above controller is usually within the range of about 600° C. to about 950° C. There has been proposed a high temperature sensor used for the controller, in which there is provided a case forming one terminal, a metal fluoride composition filled in the case and having a conducting or non-conducting state in accordance with melting or solidifying at a predetermined temperature respectively, and a conductive rod inserted into the metal fluoride composition forming the other terminal.

According to such high temperature sensor, upon melting of the metal fluoride composition at the operating temperature, a cubical expansion of about 20%–30% is produced in the metal fluoride composition, so that the metal fluoride composition is apt to leak outwardly thereby resulting in difficulties in sealing the case. At the melting state of the metal fluoride composition at the operating temperature, the conductive rod is apt to be rocked by any vibration and the like in the case thereby to come into contact with the conductive case, which results in a malfunction of the temperature controller.

Such high temperature sensor has further drawbacks in that a constant upon sensing temperature becomes large and the difference of temperature between an operating point and a resetting point becomes large, when only the metal fluoride composition is used.

SUMMARY OF THE INVENTION

The object of the present invention is to provide a high temperature sensor in which the drawbacks mentioned above are removed.

The feature of the present invention resides in a metal fluoride composition mixed with grained magnesium oxide, which is filled between a conductive case and a conductive rod.

The above and other objects, features and advantages of the present invention will become more apparent from the following detailed description of the present invention made by referring to the preferred embodiments when taken in conjunction with the accompanying drawings, in which:

BRIEF DESCRIPTION OF THE DRAWING

The sole FIGURE in the drawing shows a sectional view of the embodiment of the present invention.

DESCRIPTION OF THE PREFERED EMBODIMENT

In the drawing, reference numeral 1 designates a tube-like case, one end of which has an opening. Numeral 2 designates a conductive rod which is inserted into the case from the opening in the case. Numeral 3 designates a metal fluoride composition mixed with grained magnesium oxide filled between the conductive rod 2 and the case 1.

The case 1 is composed of a material such as nickel-base alloy, and the other end of which is closed. Numeral 4 designates a flange fixed to the peripheral surface of the case 1 at a predetermined position of the case 1. Numeral 5 designates a joint pipe surrounding the peripheral surface of the one end portion of the case 1. Numeral 6 designates a harness one end of which is connected to a connector and the other end of which is inserted into the joint pipe 5.

A core wire of the harness 6 is electrically connected to one end of the rod 2. Numeral 8 designates a heat proof rubber, such as a silicone rubber, inserted into the joint pipe 5 to insulate the portion at which the core wire of the harness 6 and the rod 2 are connected and to seal hermetically the opening of the case 1. Numeral 9 designates a protecting tube, such as a PTFE (TEFLON) tube, inserted into the joint pipe 5 to support the harness 6. Numeral 10 designates a bonding agent for sealing between the case 1 and the joint pipe 5, the rubber 8 and the joint pipe 5, the protecting tube 9 and the joint pipe 5, and the harness 6 and the protecting tube 9. Numerals 11 and 12 designate a screw for fastening the sensor to a supporter and a rubber boot respectively.

The metal fluoride composition is composed of a eutectic mixture selected among lithium fluoride LiF, sodium fluoride NaF, potassium fluoride KF, calcium fluoride $CaF_2$ and magnesium fluoride $MgF_2$, as shown in the following table indicating combinations of mixture. The lithium fluoride LiF, the sodium fluoride NaF, and the potassium fluoride KF are selected from alkali metal fluorides, and the calcium fluoride $CaF_2$ and the magnesium fluoride $MgF_2$ are selected from alkaline earth metal fluorides.

| Material No. | Melting Point (° C) | Composition of Mixture | | | (mol %) | |
|---|---|---|---|---|---|---|
| | | NaF | $CaF_2$ | $MgF_2$ | LiF | KF |
| 1 | 615 | 35 | 13 | 0 | 52 | 0 |
| 2 | 632 | 44 | 10 | 0 | 46 | 0 |
| 3 | 652 | 40 | 0 | 0 | 60 | 0 |
| 4 | 745 | 65 | 23 | 12 | 0 | 0 |
| 5 | 746 | 0 | 0 | 33 | 67 | 0 |
| 6 | 810 | 62.5 | 0 | 22.5 | 0 | 15 |
| 7 | 820 | 68 | 32 | 0 | 0 | 0 |
| 8 | 832 | 75 | 0 | 25 | 0 | 0 |
| 9 | 850 | 0 | 0 | 0 | 0 | 100 |
| 10 | 870 | 0 | 0 | 0 | 100 | 0 |
| 11 | 905 | 35 | 28 | 37 | 0 | 0 |
| 12 | 940 | 0 | 45 | 55 | 0 | 0 |

As shown in the above table, the metal fluoride compositions shown by the material numbers 1 to 12 have respective melting points within the range of 615° C. to 940° C. The metal fluoride composition mixed with grained magnesium oxide is inserted into the case 1 with pressure thereby to support the conductive rod 2 along the axis of the cylindrical case 1.

Magnesium oxide has a very much higher melting point than that of any material indicated in the above table and has no chemical reaction with the metal fluoride even at the maximum temperature which the sensor might encounter. Electro-fused magnesium oxide which has high thermal conductivity and high purity is preferably used. The amount of the magnesium oxide is preferably three to nineteen times of the amount of the metal fluoride composition in ratio by weight.

Referring now to the operation of the sensor as constructed above, the metal fluoride compostion 3 mixed with granulated magnesium oxide is in solid phase in the case when the temperature of an atmosphere to be detected is below the operating temperature of the high temperature senser, so that the electrical resistance between the case 1 and the conductive rod 2 is very high thereby to maintain the OFF state of the high temperature sensor.

On the other hand, in the case when the temperature of the atmosphere to be detected reaches the operating temperature thereof, the metal fluoride composition is melted into its liquid phase thereby to diffuse into grain boundaries of the magnesium oxide by surface tension, so that the case 1 is electrically connected to the conductive rod 2 thereby to assume an ON state thereof.

In the state of the high temperature sensor being in an operating state due to the melting of the metal fluoride composition, the grained magnesium oxide is still maintained in a solid phase. The magnesium oxide has several to ten-odd times as much amount as the metal fluoride composition has in the case 1. From the fact mentioned above, the conductive rod 2 can be stably supported by the magnesium oxide at a predetermined position of the conductive rod 2 in the case 1 thereby preventing the rod 2 from being shifted from the predetermined position by an undesirable vibration. Even when the volume of the metal fluoride composition is increased by the melting thereof, the increment of volume is absorbed since the composition in liquid phase diffuses into grain boundaries of magnesium oxide without adding pressure to the case 1. Therefore the metal fluoride composition does not leak outwardly nor damage the case 1.

Then in the case where the temperature of the atmosphere to be detected is again below the operating temperature of the high temperature sensor, the metal fluoride composition becomes again in solid phase thereby to assume an OFF state of the sensor.

The magnesium oxide has many functions in that the conductive rod 2 is supported at the predetermined position thereof, the volume expansion of the metal fluoride composition upon melting state thereof being absorbed, a thermal capacity of the sensor being made small, and further a supercooling of the metal fluoride composition is prevented when the metal fluoride composition transits from a liquid phase to a solid phase. Thus, a difference between the temperature in transition to liquid and the temperature in transition to solid can be made small. Namely, the difference of temperature between the operating point and the resetting point of the sensor can be made small.

According to the construction of the high temperature sensor, comprising a case forming one electric terminal, metal fluoride composition filled in the case and having a conductive non-conductive state in accordance with melting or solidifying the metal fluoride composition respectively, and a conductive rod inserted into the metal fluoride composition and forming the other electric terminal, wherein grained magnesium oxide is mixed with the metal fluoride composition due to melting thereof is absorbed by the magnesium oxide, so that the leakage of the composition out of the case is prevented without any sealing means for avoiding the leakage of the composition. Furthermore, the conductive rod can be held and supported at a predetermined center position without any other supporting means since the magnesium oxide is not melted and is still in solid phase at the operating temperature of the sensor. Still further, the magnesium oxide functions as an anti-supercooling material for the metal fluoride composition, so that the difference of temperature between the operating and resetting points of the sensor can be made small. Furthermore, by utilizing electro-fused magnesium oxide with high purity as magnesium oxide, the deterioration of the electrolyte composed of the metal fluoride composition is avoided and the thermal conductivity of the composition is made high thereby to make small the heat capacity of the sensor, which results in increasing the sensor response.

We claim:

1. A high temperature sensor providing a case forming one electrical terminal, a metal fluoride composition filled in said case and having a conductive or a non-conductive state in accordance with melting or solidifying of said metal fluoride composition at a predetermined temperature respectively, a conductive rod inserted into said metal fluoride composition and forming the other electrical terminal, said high temperature sensor comprising grained magnesium oxide mixed with said metal fluoride composition.

2. A high temperature sensor according to claim 1, in which the amount of said magnesium oxide is three to nineteen times of the amount of said metal fluoride composition in ratio by weight.

3. A high temperature sensor according to claim 1, in which said magnesium oxide mixed with said metal fluoride composition is composed of electro-fused magnesium oxide with grained formation.

* * * * *